United States Patent
Totzke et al.

(10) Patent No.: US 12,205,613 B2
(45) Date of Patent: *Jan. 21, 2025

(54) CONFERENCING SYSTEM AND METHOD FOR CONTROLLING THE CONFERENCING SYSTEM

(71) Applicant: RINGCENTRAL, INC., Belmont, CA (US)

(72) Inventors: Jurgen Totzke, Poing (DE); Karl Klug, Miesbach (DE)

(73) Assignee: RINGCENTRAL, INC., Belmont, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 16/898,887

(22) Filed: Jun. 11, 2020

(65) Prior Publication Data

US 2020/0302954 A1    Sep. 24, 2020

Related U.S. Application Data

(63) Continuation of application No. 16/212,908, filed on Dec. 7, 2018, now Pat. No. 10,720,175, which is a (Continued)

(30) Foreign Application Priority Data

Dec. 9, 2014    (DE) .................. 102014018205.3

(51) Int. Cl.
*G10L 25/63*    (2013.01)
*G06Q 10/10*    (2023.01)
*G10L 15/26*    (2006.01)
*H04N 7/15*    (2006.01)

(52) U.S. Cl.
CPC ............. *G10L 25/63* (2013.01); *G06Q 10/10* (2013.01); *G10L 15/26* (2013.01); *H04N 7/152* (2013.01)

(58) Field of Classification Search
CPC ......... G10L 25/63; G10L 15/26; G06Q 10/10; H04N 7/152

See application file for complete search history.

(56) References Cited

U.S. PATENT DOCUMENTS 7,643,628 B2    1/2010  Hans et al.
9,691,412 B2 *  6/2017  Totzke .................. H04N 7/152
(Continued)

FOREIGN PATENT DOCUMENTS

CN    101790071 A    7/2010
CN    203015010 U    6/2013
(Continued)

OTHER PUBLICATIONS

Search Report of Chinese Patent Application Serial No. 2015108996848 dated Feb. 27, 2018.

*Primary Examiner* — Abul K Azad
(74) *Attorney, Agent, or Firm* — Finnegan, Henderson, Farabow, Garrett & Dunner LLP

(57) ABSTRACT

A communication system and a method can be configured to facilitate the performance of a conference. The system can include a conference organizer terminal and at least two participants' terminals each assigned to respective conference participants who each log in to start a conference on the communication system. The communication system can be configured to calculate a decision situation at a particular point in time of the ongoing conference by analyzing the views expressed by the conference participants during the conference and send data relating to the decision situation for that point in time to the conference organizer's terminal and/or other conference participant terminals for use in facilitating the conference. IN some embodiments, such data can be used to assist the conference participants' in recog- (Continued)

nizing when there is a consensus made on at least one decision to be made during the conference.

3 Claims, 5 Drawing Sheets

Related U.S. Application Data continuation of application No. 15/604,008, filed on May 24, 2017, now Pat. No. 10,186,281, which is a continuation of application No. 14/962,010, filed on Dec. 8, 2015, now Pat. No. 9,691,412.

(56) References Cited

U.S. PATENT DOCUMENTS

| | | | |
|---|---|---|---|
| 10,186,281 B2* | 1/2019 | Totzke | G10L 25/63 |
| 10,720,175 B2* | 7/2020 | Totzke | H04N 7/152 |
| 2004/0246331 A1 | 12/2004 | Caspi et al. | |
| 2004/0264390 A1 | 12/2004 | Suzuki | |
| 2007/0106724 A1 | 5/2007 | Gorti et al. | |
| 2007/0133437 A1* | 6/2007 | Wengrovitz | G10L 15/26 704/E15.045 |
| 2008/0320082 A1 | 12/2008 | Kuhlke et al. | |
| 2012/0323575 A1 | 12/2012 | Gibbon et al. | |
| 2014/0253672 A1 | 9/2014 | Bank et al. | |
| 2014/0258393 A1* | 9/2014 | Bank | G06Q 10/10 709/204 |

FOREIGN PATENT DOCUMENTS

| | | |
|---|---|---|
| EP | 1271341 A2 | 1/2003 |
| FR | 2949894 A1 | 3/2011 |
| GB | 2469355 A | 10/2010 |
| WO | WO 2012113573 A2 | 8/2012 |
| WO | WO 2013086301 A1 | 6/2013 |

* cited by examiner

CONFERENCING SYSTEM AND METHOD FOR CONTROLLING THE CONFERENCING SYSTEM

CROSS-REFERENCE TO RELATED APPLICATIONS

This application is a continuation application of, and claims the benefit of priority to U.S. patent application Ser. No. 16/212,908, filed on Dec. 7, 2018, which is a continuation application of, and claims the benefit of priority to U.S. patent application Ser. No. 15/604,008, filed on May 24, 2017, which is a continuation application of, and claims the benefit of priority to U.S. patent application Ser. No. 14/962,010, filed on Dec. 8, 2015, which claims priority to German Patent Application No. 10 2014 018 205.3 which was filed on Dec. 9, 2014, the entire contents of all of which are incorporated by reference herein.

FIELD OF THE INVENTION

This invention concerns a method for controlling a conferencing system, a non-transitory computer program product, a non-transitory machine-readable data carrier with a computer program product stored on it, and a conferencing system.

BACKGROUND OF THE INVENTION

As business has become more globalized, the use of conferencing systems, required for telephone and video conferences, has become more and more common.

Conference participants are often widely distributed geographically. In addition to "pure" video or audio conference execution, mixed forms of this application are also possible, in which, for example, participants use only the audio channel to participate in a video conference, as might occur when one or more conference participants are traveling and wish to participate in the conference, but have only limited data transmission capability available to them. Compared to a conference at which all participants are present, it is more difficult to handle participation and action in a virtual conference. This means that these types of conferences often last longer than desired, while occupying the system resources associated with them, in particular the use of corresponding conferencing systems and the related energy and telecommunication costs. To improve the participant experience in such teleconferences (hereinafter simply called conferences), speaker identification can be used, for example, to show which participant is currently speaking. The participants can be arranged in a virtual conference room, for example, so that the orientation of the person currently speaking is made easier in audio conferences.

There are multiple known techniques for facilitating the execution of telephone or video conferences. EP 1 271 341 A2 discloses a system for analyzing text data in order to display, in particular, information concealed in text data, so that certain merchandise items can be offered to customers in a more targeted manner, for example.

In addition, WO 2013/086301 A1 describes a teleconference access system in which participants are brought together into the same teleconference, supported by a computer. The system includes a unit that can use remarks from participants, entered in text form, to filter out a consensus that may have been reached.

US 2012/0323575 A1 describes a system with which the content of what a speaker is saying can be visually represented and with which, if applicable, the mood or emotions of the speaker's content can also be grasped and represented.

FR 2949894 A1 discloses a system with which a speaker's courtesy, in a television discussion, for example, can be grasped and represented.

The goal of a conference is often to resolve one or more differences regarding certain issues. When such a conference is conducted, often the most widely differing camps form into coalitions of those participants in favor, those against, or those remaining neutral, which can still change during the course of the conference. There can also be a unanimous consensus at the end. It can also occur that some participants do not get any or a properly timed opportunity to speak, making the conference inefficient, which generally results in an unnecessarily long conference.

None of the aforementioned documents can help a conference organizer or moderator solve all the problems described.

SUMMARY OF THE INVENTION

Embodiments of the invention can be configured to address the issue of proposing a conferencing system and a method for controlling the conferencing system, whereby the user experience in teleconferences is improved and, in particular, the organizer and/or moderator may be aided in reaching a consensus or forming a majority of the participants, which also results in efficient use of the resources required by the conferencing system.

This objective can be achieved with a computer-implemented method, a computer program stored in a non-transitory computer readable medium, a non-transitory computer program product, a non-transitory machine-readable data carrier with a computer program stored on it, and a conferencing system.

One embodiment of a method according to the invention for controlling a conferencing system involves the following steps: a conference organizer's terminal (which is assigned to an organizer and/or moderator who represents a first conference participant) logs in (e.g., by means of address collection) on the conferencing system in order to initiate a conference. Next, other (at least two) participant terminals, each of which is assigned to a corresponding additional conference participant, log in on the conferencing system. The respective terminals forward the appropriate voice and/or image data for their assigned participants to the conferencing system and display the corresponding voice and/or image data for the other conference participants, so that they can follow the conference. Embodiments of the invented method can be intended to make it possible for a decision to be made regarding the main issue of the conference, based on the views expressed by the conference participants, and for the organizer to then end the conference using his conference organizer's terminal. Embodiments of the method can be configured so that the conferencing system assesses a particular decision situation, based on an analysis of the conference participants' views expressed in the form of audio and/or video signals, and transmits that particular decision situation to the conference organizer's terminal—and optionally also to other terminals.

In this way, embodiments of the invented method can allow the conference organizer to have information about the particular or current decision situation at all times, allowing him or her to end the conference successfully at the earliest possible time. As part of this process, social and non-technical information and situations can be transformed by technical means into a verifiable user experience for the organizer, which otherwise would happen only in his imagination. This user experience usually exceeds the humanly possible grasp of the decision situation. In some embodiments use of the resources required to run the conference can thus be kept to a minimum. Embodiments of the invented method can also be used advantageously to plan future conferences.

According to one advantageous embodiment of the invented method, the conferencing system can record the views expressed by the conference participants and transforms them by means of transcription into analyzable data, such as written text, for example. Then the conferencing system can derive the current decision situation from these analyzable data.

In order to allow for the fact that views expressed in the course of such a conference can also be stated sarcastically or jokingly and therefore may mean the opposite of what was actually said, the conferencing system can acquire the mood of each conference participant when their views are expressed, in order to determine the true content of the respective views expressed and apply their influence to evaluating the current decision situation.

According to one advantageous embodiment of the invented method, the conferencing system can calculate a cumulative weighted position value for each individual conference participant, which represents the current decision position of that particular conference participant, and in calculating the cumulative weighted position value can give lower priority or less weight to older, i.e., further back in time, expressed views than to newer (i.e., more recent) expressed views. In this way, the decision situation being assessed by the invented method stays current with changes in the opinions of one or more conference participants, as expressed in their statements (e.g. audible statements that have been transcribed or other statements).

In one exceptionally advantageous embodiment of the invented method, the current coalition formation of participants with consensus is graphically displayed, with optional indication of changes in the positions of individual participants. As an additional option, previous coalition formations can be stored and called up as history. In addition to this graphic overview display, the current period and cumulative periods can also be shown alternatingly in statistical form, as bar charts, for example. In this way, the position of each individual participant can be compared to each of the other participants and singled out if desired.

The following formula can be used for this:

$$s_{nm} = \sum_{j=1}^{a} a_{nmj} * b_{nmj}$$

with $S_{nm}$ as the sum of evaluated dialogs between person n and person m within the period concerned. Dialogs between person n and person m are evaluated in the period concerned ($a_{nm}$). Each indication of agreement, neutrality, or dissent is assessed during the evaluation as:

$$a = \begin{cases} +1 & \text{for agreeing statement} \\ -1 & \text{for dissenting statement} \\ 0 & \text{for undetermined} \end{cases}$$

Statements that are sarcastic in nature are appropriately assessed as the opposite viewpoint ($b_{nm}$) as:

$$b = \begin{cases} -1 & \text{for sarcastic statement} \\ +1 & \text{for neutral statement} \end{cases}$$

c represents the number of dialogs between person n and person m in the period concerned.

When determining the cumulative weighted position value, current evaluations can be weighted more heavily than older ones, e.g., using the formula with i ongoing or ended periods and k=max. number of iterated periods. The older the periods for evaluated dialogs between person n and person m, the higher the weighting factor in the denominator of the summand, and correspondingly the lower the contribution of the sum.

$$v_{nm} = \sum_{i=1}^{k} \frac{s_{nm}[i]}{k - (i + 1)}$$

It can often be particularly useful to the organizer and/or possible moderator of the conference to have the current decision situation displayed on his (their) terminal(s), and it is additionally helpful when there is a separate display for each individual conference participant, so that their position or change in position can be acquired and tracked over time. Of course, the display can also be generated on other terminals.

A conferencing system that can include a conference organizer's terminal assigned to a first conference participant, at least two participant terminals, each assigned to another individual conference participant, and a control unit for registering the various terminals. A control unit of the system can be configured such that the previously described method is implemented by a computer.

According to one particularly advantageous embodiment of the invented conferencing system, it has at least one of the following items:
  a media recording unit for recording the audio and/or video signals generated during the course of the conference,
  a participant recognition unit for identifying participants based on the audio and video signals provided by the media recording unit,
  a transcription unit for transcribing the audio and/or video signals provided by the media recording unit,
  a dialog acquisition unit for acquiring dialogs between conference participants and individual statements made by conference participants by processing the transcribed audio and/or video signals,
  a text analysis unit for analyzing the transcribed audio and/or video signals with respect to agreeing, dissenting, and neutral views expressed,
  a mood detection unit for analyzing the transcribed audio and/or video signals in order to determine the conference participants' moods,
  a display unit for generating a visual representation of the current decision situation on the conference organizer's terminal, and
  an iteration unit for generating additional iterations when determining the current decision situation.

Embodiments of the invention can also be configured as a non-transitory computer program or computer program product or a non-transitory machine-readable data carrier on which a computer program is stored.

Address collection, image identification, and/or voice recognition can be used in embodiments of the invention to acquire the presence of participants as an initial situation of the conference. Statements or views expressed by the participating people can be technically acquired and evaluated using the previously described metrics and semantics. Dialogs can be chronologically acquired during the conference and made available as text by means of transcription, with translation if applicable. The resulting text can undergo an analysis in which agreeing and dissenting statements are recognized with respect to the preceding speaker or by someone being personally addressed, such as a name stated by a third person. Mood analysis—also called sentiment detection—can be used to differentiate between serious and sarcastic or joking statements. After some time of discursive discussion, there is usually a decision situation (which can also be called a coalition) that can be identified by a longer pause in the discussion and recognized via the last agreeing or dissenting verbal statements by the participants.

According to one embodiment of the invented method, first the identities of all participants are determined and the ongoing conference duration is measured. Spoken contributions by individual participants, as well as other interpretable articulations of these participants (such as muttering or sighing) are counted and compared to those of the other participants. By means of text analysis and sentiment detection, these measurements are qualified as either agreeing or dissenting. The system can be configured so that longer breaks in the discussion among participants initiate or trigger a new assessment of the decision situation. Alternatively, this can be caused by interaction between the organizer and/or moderator of the conference and its various terminals. The organizer and/or moderator can also reset the assessment of the decision situation if a new item on the agenda is started, for example. According to another embodiment of the invented method, the conferencing system indicates the terminals involved, by recognizing keywords that signal the conclusion of the previous or a transition to the next agenda segment.

Embodiments of the invented method preferably includes an accompanying display of the present or current decision situation on at least the organizer's terminal (which can be stationary (e.g. desktop personal computer) or mobile (e.g. smartphone, tablet, laptop computer, etc.)), and also on other participants' terminals if applicable. The selected display can either be very simple, such as only the corresponding text, for example, or can extend to photos or avatars and to video images, and this display can generate an arrangement of participants within a group representation corresponding to their coalition position, using the recognized decision or coalition situation, and display it correspondingly. Participants who remain neutral are shown as separate groups or individuals, for example. They can be addressed specifically by the organizer and asked to express their views, for example. Embodiments of the invented method can be configured to assess the current decision situation and the availability of a consensus formation using the determined current decision situation. Use of this assessment and identifying the availability of a consensus that may be present during a conference that may be performed by a communication system and communicated via the system to at least a moderator or organizer of the conference can result in a more efficient conference as the moderator or organizer may be able to utilize such information to bring the conference to a close by use of the knowledge of the developed consensus identified by the conference system.

Larger shifts in coalition formations can also be documented in chronological order and can be called up individually by the conference organizer (or also another participant if desired). In addition, the history of a conference or of a situation at a particular point in time can be added to the transcripts or media record in the conferencing system and played back at the appropriate time. It is also possible to generate a related statistical report for each participant's participation and provide a metric for the efficiency of the discussion, which can be especially helpful to the conference organizer or moderator.

Other details, objects, and advantages of the invention will become apparent as the following description of certain exemplary embodiments thereof and certain exemplary methods of practicing the same proceeds.

BRIEF DESCRIPTION OF THE DRAWINGS

Additional advantages, features, and characteristics of the present invention are presented in the following description of advantageous embodiments with reference to the drawing. It should be appreciated that like reference numbers used in the drawings may identify like components. The figures show schematically.

DETAILED DESCRIPTION OF EXEMPLARY EMBODIMENTS

Figure 1:
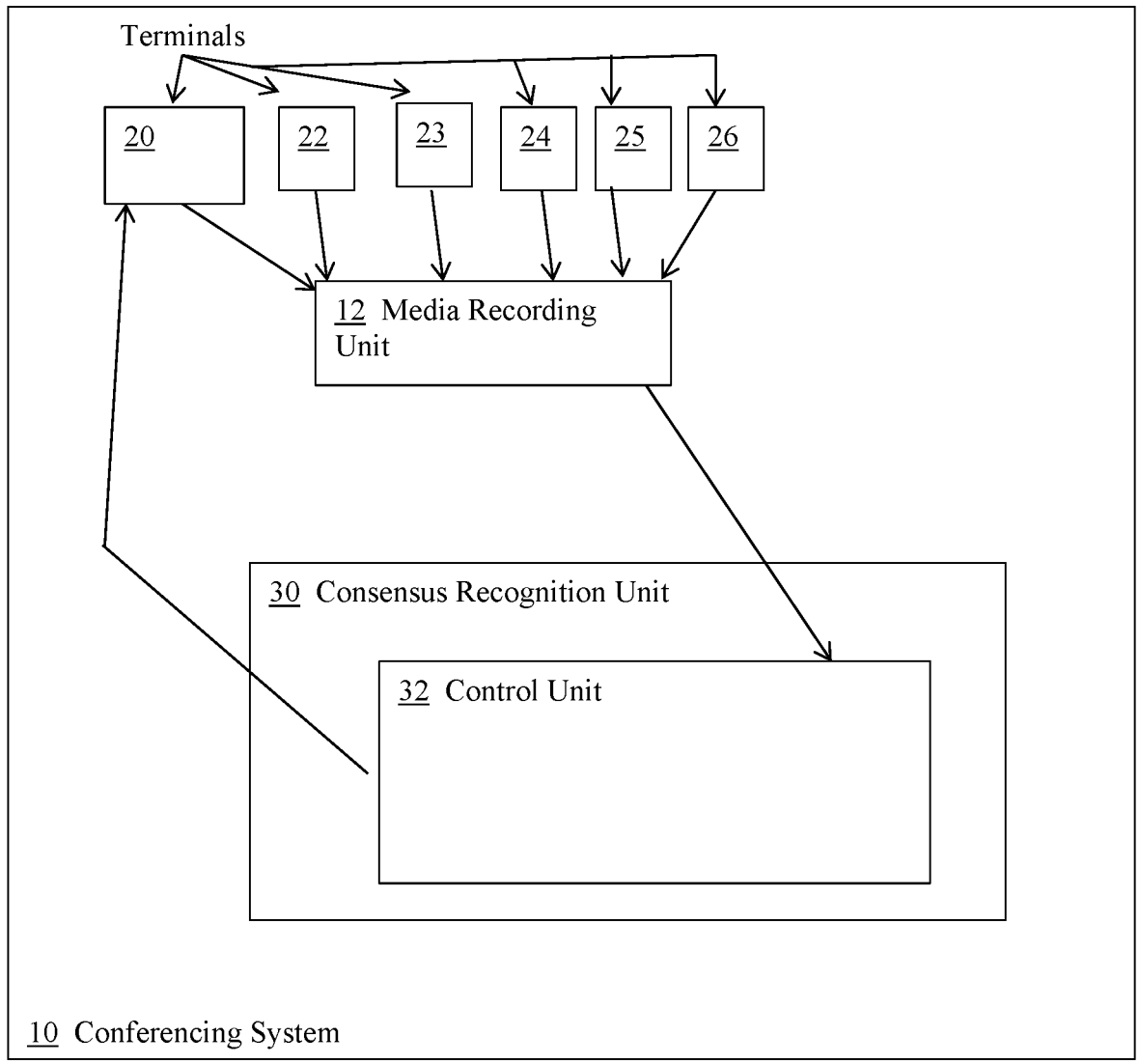
FIG. 1 is a block diagram of an exemplary embodiment of a communication system configured as a conferencing system.

Referring to FIG. 1, one embodiment of a communication system can be configured as a conferencing system 10. The conferencing system 10 can include a consensus recognition unit 30 containing a control unit 32 as the central instance, plus a (conference) organizer's terminal 20 and multiple participant terminals 22-26 connected to a media recording unit 12, which records media data coming from the terminals 20 and 22-26, in particular audio and video data, and sends those data to the consensus recognition unit 30.

Figure 2:
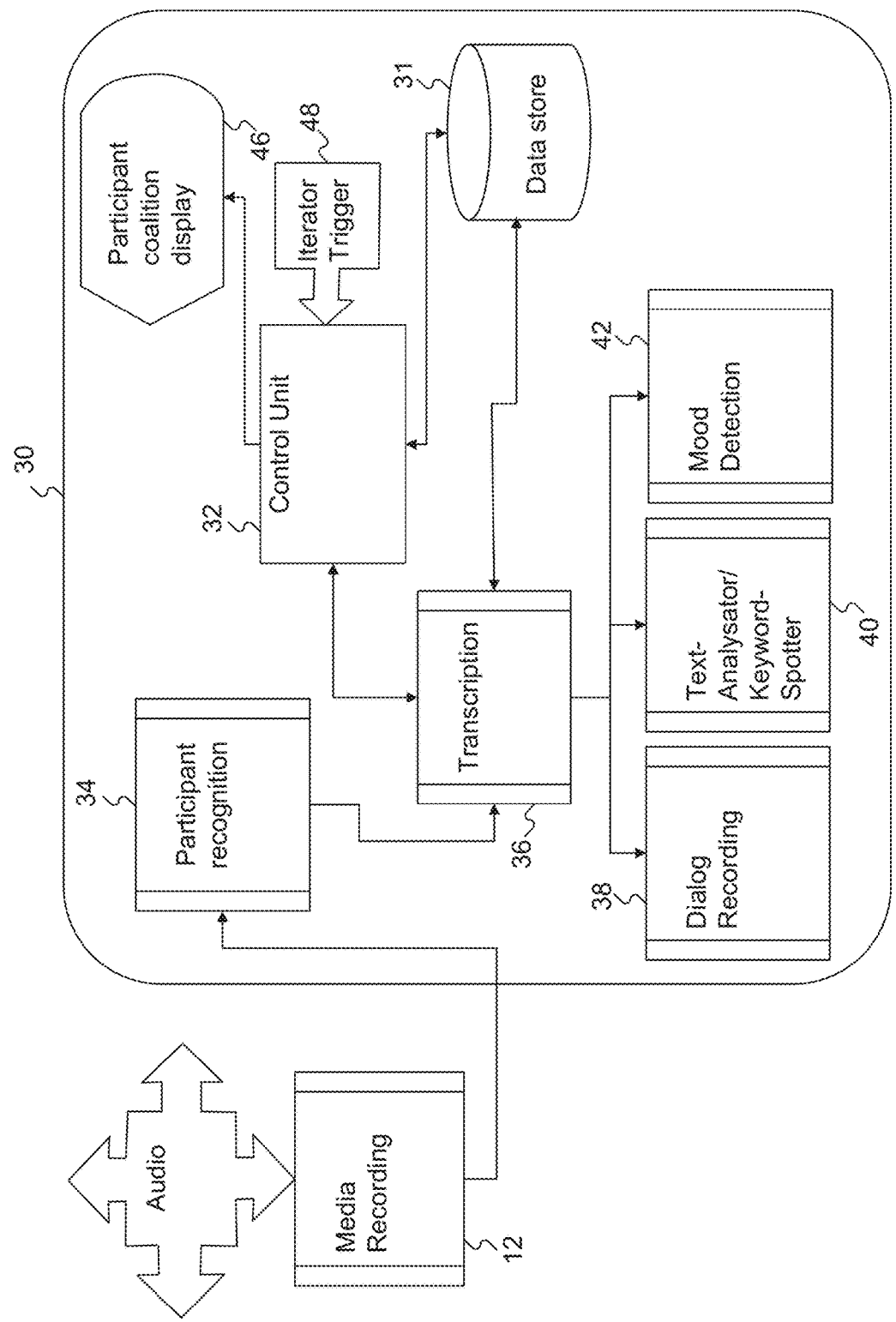
FIG. 2 is a block diagram of an exemplary embodiment of a consensus recognition unit according to the invention that may be utilized in an embodiment of the communication system.

Referring to FIG. 2, which provides a detailed schematic view of the consensus recognition unit 30 together with the media recording unit 12 of the conferencing system. The data from the individual conference participants (including, of course, the organizer with the organizer's terminal 20 assigned to him) recorded by the media recording unit 12 can be transmitted to a participant recognition unit 34 that identifies the corresponding participants from the transmitted audio and video signals. The identification can be made based on a number of different features, such as voice recognition, identification indicia included in the data on which the audio and/or video signals are included, or other data. The audio and video signals are then sent to a transcription unit 36, which transcribes at least the audio signals into text data. The results of this transcription are stored in a data store 31 (e.g. a database or a data bank) so that they can be called up immediately when needed. The transcription unit 36 can be connected to a control unit 32 (e.g. a central control unit) that controls the entire consensus recognition unit 30 as well as the complete conferencing system 10 as needed. It should be appreciated that the control unit 32 may be configured as a hardware element such as a processor or other type of hardware processing device.

Multiple units can be connected to the transcription unit 36 and use the transcribed audio and/or video signals such as, for example: (i) a dialog capturing unit 38 that acquires the dialogs between conference participants, as well as individual statements from conference participants and their number and length by analyzing the transcribed audio and video signals, (ii) a text analysis unit 40 (also called a keyword spotter) that searches through the texts for agreeing, dissenting, and neutral expressed views, even if they are part of complex statements, and (iii) a sentiment detection unit 42 that searches through the transcribed audio and video signals to see whether any agreeing or dissenting views expressed therein may have been stated sarcastically or jokingly and are supposed to mean exactly the opposite, for example, or should be considered as indicating only limited agreement or dissent. In some embodiments, the transcription unit 36, the dialog capturing unit 38, the text analysis unit 40 and/or the sentiment detection unit 42 may be separate hardware elements in some embodiments of the communication system. In other embodiments, these units may be software modules that are called up or part of a program that is stored on non-transitory computer readable medium and are utilized when that program is executed by a processor.

The control unit 32 can compute a current decision situation for a point in time using the transcribed audio and video signals. The computed decision situation may be computed in such a way that it can illustrate the decision position for each conference participant concerning the issue being decided. A display unit 46 can be connected to this control unit 32 and can generate a visual representation of the decision situation at that point in time to have that visual shown on the organizer's terminal 20 based on the computation made by the control unit 32. An iteration unit 48 can also be connected to the control unit 32 and can initiate or request for additional iterations while assessing the current or present decision situation.

Figure 3:
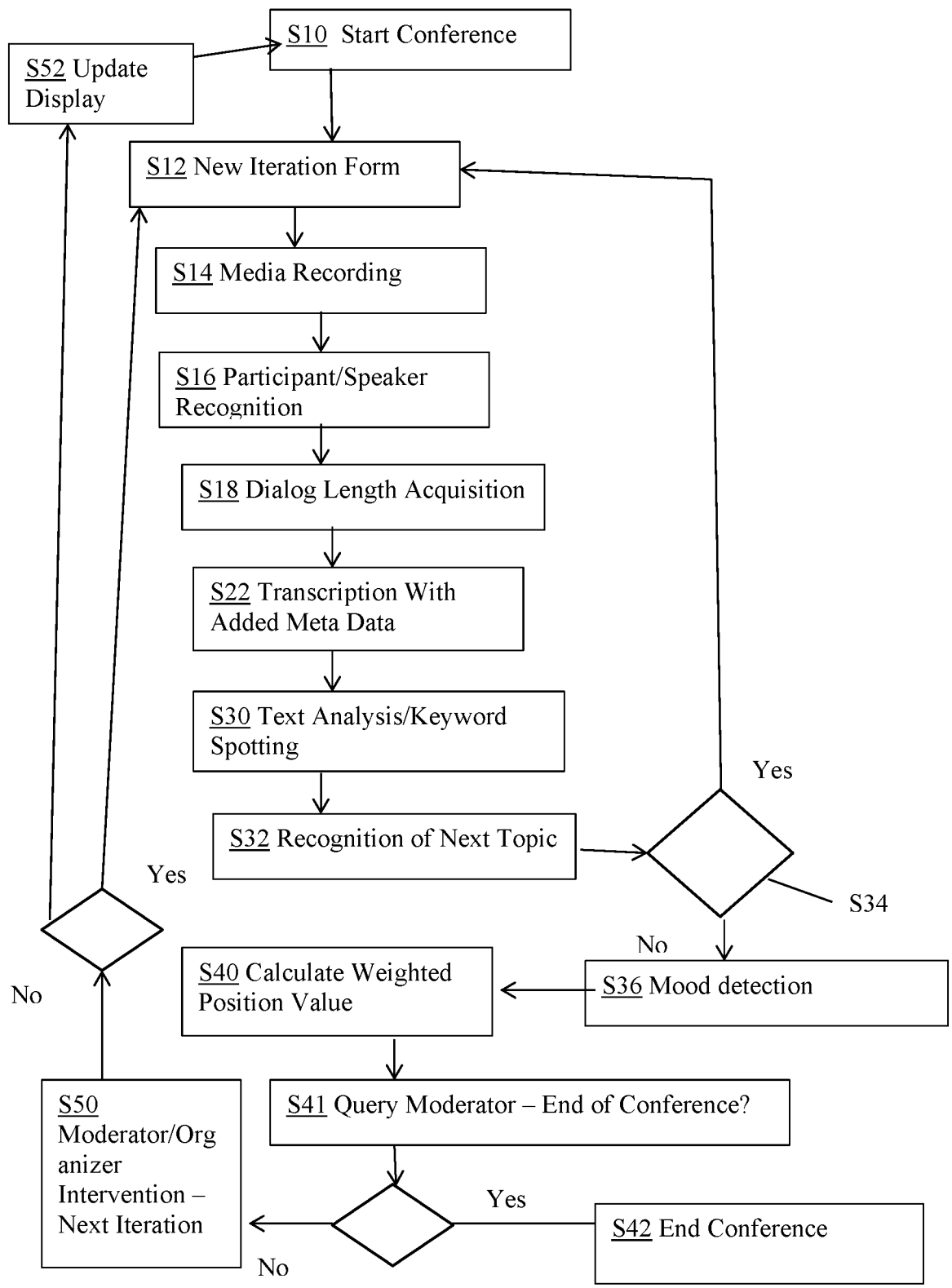
FIG. 3 is a flow chart diagram illustrating an exemplary embodiment of a method for controlling a conference.

FIG. 3 is a flow chart that illustrates a method of running a conference. The conference can be started in a step S10 when the organizer logs in on his organizer's terminal 20 and at least two other participants log in on their terminals 22, 23, 24, 25, 26 . . . . In a step S12, the iteration unit 48 begins a first round of assessing the consensus. The callout "Form." in step S12 means that, for a new conference or a change of topic, a new form is opened for recording the measured metadata, metrics, and statistics. In a step S14, the media (audio and/or video signals) coming from the terminals 20, 22-26 are recorded, after which they are submitted in a step S16 for participant/speaker recognition. In a subsequent step S18, the lengths of any dialogs are determined. Next, in a step S22, transcription is enriched with metadata regarding speakers, lengths, agreeing/dissenting and, if applicable, sarcastic statements related to a previous speaker or a named participant. In a step S30, the transcribed audio and video signals undergo text analysis to filter out agreeing, dissenting, and neutral expressed views. In a subsequent step S32, the system checks to see if the participants have already moved to the next topic. If this is not the case, in step S34 it is decided that sentiment detection will be run in step S36, in order to differentiate between serious expressed views and statements made sarcastically or jokingly and weight them accordingly. Next, in a step S40, a weighted position value is calculated that represents the decision situation at that point in time, and it is sent to the conference organizer and/or moderator. If the organizer wishes to end the conference (which is queried in a step S41) because he considers the topic to be ready for a decision based on the information sent to him regarding the weighted position value or current decision situation, he makes or announces this decision and ends the conference in a step S42. If the organizer wishes to continue the conference, he can initiate the next iteration in a step S50 and update the display on his terminal 20 in a step S52. The method then proceeds as described in step S12.

If it is determined in step S34 that the conference has already moved on to the next topic, the method goes to step S12 and initiates a new iteration in order to discuss the new topic. Obviously, media recording (step S14) can continue for as long as necessary in either case.

At the beginning of the audio/video conference, first the participants are recognized, and usually no coalitions or decision situations are recognizable yet. Typically, after the introductory formalities and a statement of positions, a first discussion begins. Recording the arriving audio and video signals (media) with simultaneous or immediately following transcription allows for analysis of the texts resulting from the transcription for the expression of supporting views (e.g. "I agree [with the person who spoke before me], . . . ," "Exactly," . . . ) or dissenting views (e.g. "I can't understand that," "I see that differently," "Can you explain that again . . . ") or idiomatic expressions in the text analysis unit 40 (also called a keyword spotter). Here it is also advantageous to use the sentiment detection unit 42 in order to be able to realistically assess the seriousness or relevance of the changes occurring.

Figure 5:
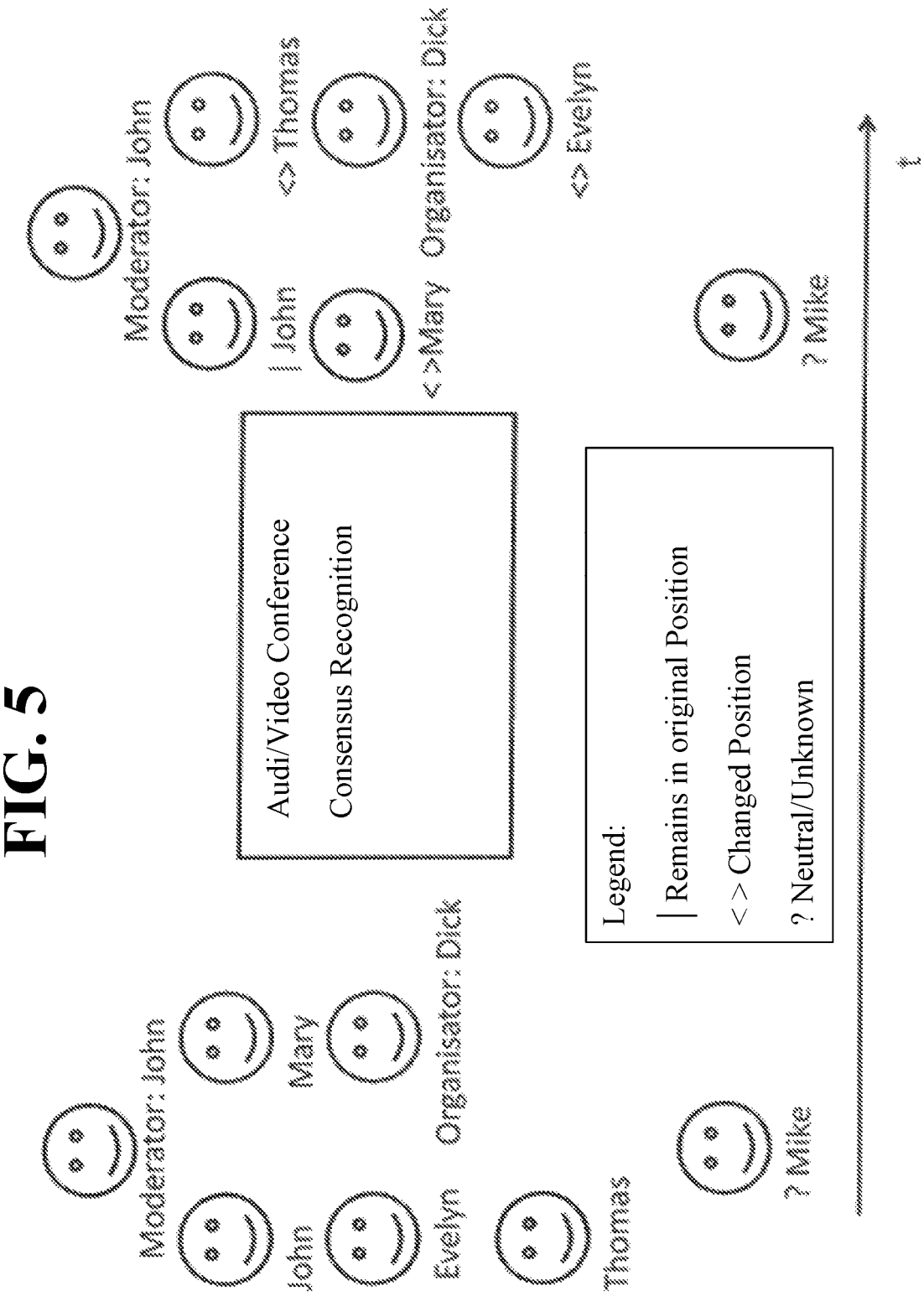
FIG. 5 is a diagram of an exemplary display illustrating a consensus recognition during a conference.

If the position does not relate to the preceding speaker but instead to another person in the conference, then usually that person is addressed by name (e.g. "I rather agree with what Dick said . . . "), and that allows these positions to be added to the assessment of the present or current decision situation. After a while, if a significant number of participants have expressed their views, a first coalition or consensus representation can be displayed based on their positions, as shown in FIG. 5, for example.

After a pause in the discussion and additional statements, the display can be updated if necessary. In FIG. 5, the moderator John is known to the conference or moderating organization, as is the organizer Dick (who is typically the person that requested and organized the conference). The display unit 46 receives this information from the conferencing system 10 at the beginning. Obviously, the moderator and organizer can also be one and the same person. According to the example shown in FIG. 5, only Mary and Dick hold to one position, while John, Evelyn, and Thomas hold the opposing opinion. Mike's position is unclear, as he has not yet participated. This situation is shown on the left side of FIG. 5. During the discussion, Mary switches to John's unchanged position, while Thomas and Evelyn are convinced to side with Dick. Mike's position on this issue remains unclear. This situation is shown on the right side of FIG. 5. People whose opinion or position has changed are indicated by a double arrow. The invented system can ignore Mike's display, for example, or as another option it can display his undecided position specifically only to the moderator and/or organizer. This would allow John, as moderator, to ask Mike for his opinion, in order to get an appropriate expression of his views.

Embodiments of the invented method, in conjunction with embodiments of the invented system, can therefore contribute to efficient discussions or teleconferences, for example, if it quickly indicates a consensus or majority among the participants regarding the organizer's subject of interest. The moderator can use it to establish the final result and can then end the conference much earlier when there is no longer any inconsistency in the overall viewpoint. This allows the invention to save on the resources required to conduct a teleconference.

Figure 4:
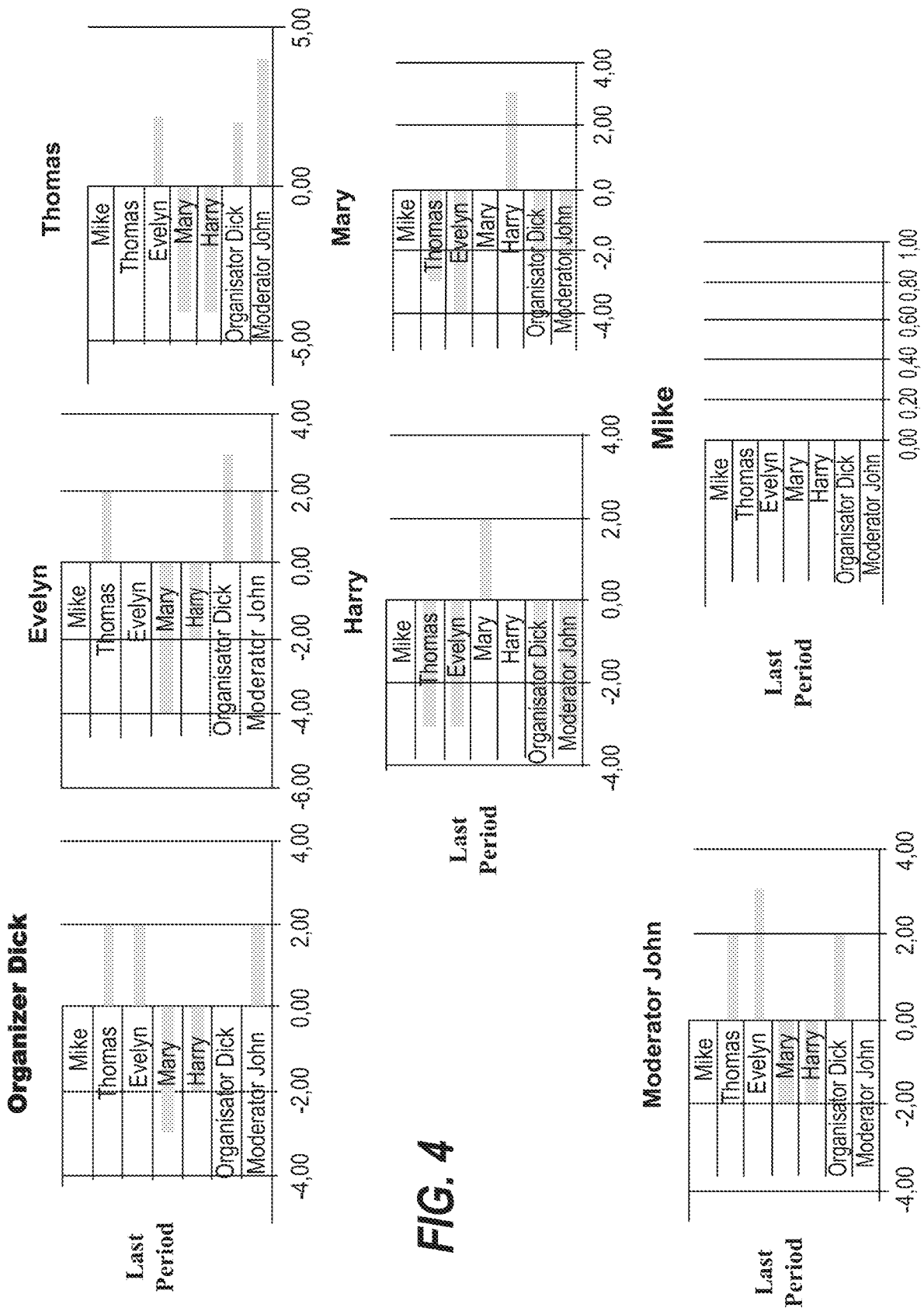
FIG. 4 a schematic diagram of an exemplary statistical report for consensus recognition at a conference that may be output (e.g. displayed or printed) by a display device of a terminal or by a terminal of the communication system.

The dialog acquisition unit 38 can record the number of statements and, if applicable, also each participant's speaking time, changes in position, participation share, etc. These statistics can be displayed continuously and/or at the end, and it is possible for this display to be made available only to the moderator and/or organizer if desired. A statistical report for the last period of dialogs is shown as an example in FIG. 4. Bar charts are displayed for each participant with respect to the other participants, wherein positive numbers represent predominantly agreeing positions and negative numbers represent predominantly dissenting positions. In the overview, it is easy to see that, within the latest dialog, there is consensus between the organizer Dick and the moderator John and also with the participants Evelyn and Thomas, while the participants Harry and Mary hold opinions opposite to those of the other participants. The participant Mike has not joined in to this dialog.

According to one advantageous embodiment of the invention, the method is configured such that positions are consolidated or converge during the course of the conference. For this purpose, more recent statements are weighted successively more heavily than older statements for the weighted position value. This makes it possible to use these metrics for assessing discussion efficiency.

It can be seen that the present invention has a variety of method and equipment features that are interconnected with each other. From this it is clear that the method steps or features correspond to the various devices or units in the conferencing system and also, inversely, even the most widely differing equipment features correspond to various method steps or method features, even when this is not specifically described.

It should be noted that the features of embodiments of the invention described herein by referencing the presented embodiments, for example the type and configuration of individual method steps and analysis methods, such as individual analysis parameters and units in particular, can also be present in other embodiments, unless stated otherwise or prohibited for technical reasons. Not all features of individual embodiments described in combination must necessarily always be implemented in any one particular embodiment. Therefore, while certain exemplary embodiments of a communication system and communication apparatus and methods of making and using the same have been discussed and illustrated herein, it is to be distinctly understood that the invention is not limited thereto but may be otherwise variously embodied and practiced within the scope of the following claims.

LIST OF REFERENCE INDICATORS

10=Conferencing system
12=Media recording unit
20=Conference organizer's terminal
22-26=Participants' terminals
30=Consensus recognition unit
31=Data bank
32=Control unit
34=Participant recognition unit
36=Transcription unit
38=Dialog acquisition unit
40=Text analysis unit
42=Sentiment detection unit
46=Display unit
48=Iteration unit
90=Data carrier
92=Computer program product
S10-S52=Method stops

What is claimed is:

1. A computer-implemented method of improving a conference, the method comprising:
receiving audio data during the conference;
recording data reflecting views expressed by one or more participants based on the received audio data;
determining a position and a mood of the one or more participants from the recorded data;
weighting the determined position based on the determined mood for the one or more participants;
determining a decision situation at a point in time from the position of the one or more participants, wherein determining the decision situation comprises determining position changes of the one or more participants; and
causing to display the decision situation.

2. A non-transitory, computer-readable medium, storing instructions that, when executed by a processor, cause:
receiving audio data during the conference;
transcribing expressed views of one or more participants from the audio data to text data;
determining a cumulative weighted position value for the expressed views of the one or more participants from the text data;
determining a decision situation at a point in time using the cumulative weighted position value of the one or more participants, wherein determining the decision situation comprises determining position changes of the one or more participants; and
causing to display the decision situation.

3. The A conferencing system, comprising:
a processor;
a memory operatively connected to the processor and storing instruction that, when executed by the processor, cause:
receiving audio data during the conference;
transcribing expressed views of one or more participants from the audio data to text data;
determining a position and a mood of the one or more participants from the text data;
weighting the determined position based on the determined mood for the one or more participants;
determining a decision situation at a point in time from the position of the one or more participants;
calculating a cumulative weighted position value for the expressed views of the one or more participants, wherein calculating the cumulative weighted position value comprises giving older expressed views less weight;

generating a current decision position of the one or more participants using the cumulative weighted position value;
causing to display the decision situation; and
causing to display the current decision position of the one or more participants.

\* \* \* \* \*